United States Patent [19]
Yoshimura et al.

[11] Patent Number: 5,588,674
[45] Date of Patent: Dec. 31, 1996

[54] INTERVENING CLOTH ON AN AIR BAG

[75] Inventors: Toshifumi Yoshimura; Ryo Kikuchi; Shoji Iinuma, all of Fujisawa, Japan

[73] Assignee: Isuzu Motors Limited, Tokyo, Japan

[21] Appl. No.: 434,301

[22] Filed: May 3, 1995

[30] Foreign Application Priority Data

Oct. 7, 1994 [JP] Japan .................... 6-244298

[51] Int. Cl.$^6$ .............. B60R 21/22; B60R 21/16
[52] U.S. Cl. ......................... 280/732; 280/728.1
[58] Field of Search ............... 280/728.2, 730.1, 280/732, 743.1, 743.2, 731, 728.1, 728.3

[56] References Cited

U.S. PATENT DOCUMENTS

| | | | |
|---|---|---|---|
| 3,756,620 | 9/1973 | Radke | 280/743.2 |
| 4,842,300 | 6/1989 | Ziomek et al. | 280/732 |
| 5,217,254 | 6/1993 | Satoh | 280/728.2 |
| 5,242,191 | 9/1993 | Faigle et al. | 280/732 |
| 5,242,192 | 9/1993 | Prescaro et al. | 280/730.1 |
| 5,348,343 | 9/1994 | Hawthorn | 280/730.1 |
| 5,364,124 | 11/1994 | Donegan et al. | 280/730.1 |
| 5,447,329 | 9/1995 | Hamada | 280/728.1 |
| 5,452,913 | 9/1995 | Hansen et al. | 280/732 |

FOREIGN PATENT DOCUMENTS

| | | | |
|---|---|---|---|
| 2503447 | 8/1975 | Germany | 280/732 |
| 2-158444 | 6/1990 | Japan | 280/728.2 |
| 3-39326 | 8/1991 | Japan . | |
| 4-55149 | 2/1992 | Japan . | |
| 5-213132 | 8/1993 | Japan . | |
| 6-127321 | 5/1994 | Japan | 280/728.2 |

*Primary Examiner*—Brian L. Johnson
*Assistant Examiner*—Peter C. English
*Attorney, Agent, or Firm*—Antonelli, Terry, Stout & Kraus

[57] ABSTRACT

An air bag device, which is installed in the dashboard of a vehicle, contains a folded air bag. One end of an intervening cloth is secured where the air bag is mounted to the air bag device or to the air bag and the other end is left free. In the absence of the intervening cloth, when an inflator is activated to deploy the air bag through the unit door, the air bag generates friction by contacting the unit door or the vehicle's front glass. The intervening cloth, however, intervenes between the air bag and such surfaces to provide a constant friction, thus allowing smooth deployment of the air bag.

5 Claims, 8 Drawing Sheets

INTERVENING CLOTH ON AN AIR BAG

BACKGROUND OF THE INVENTION

This invention relates to an air bag device installed inside the dashboard on the passenger side of an automobile.

Japanese Laid-Open Patent No. 3-39326 (1991) and No. 5-213132 (1993) disclose a type of air bag device that protects people in a vehicle during impact by providing a cover for the outer surface of the air bag. Japanese Laid-Open Patent No. 4-55149 (1992) discloses a type of air bag device that has a piece of cloth installed between the air bag module cover and the air bag.

In the above two examples, however, the air bags are provided only for the drivers. Also, the external covers are intended to reduce the impact on the drivers, and thus do not control the friction of the deploying bag. The latter example, especially, simply prevents direct contact between the air bag and the module cover and does not facilitate smooth deployment of the bag or maintain a certain level of friction between the air bag and interior elements of the automobile.

SUMMARY OF THE INVENTION

The purpose of the air bag device of this invention is to prevent the air bag from coming into direct contact with interior elements and to facilitate smooth deployment and contraction of the air bag with a constant level of friction during deployment. The air bag device of this invention is equipped with an air bag that is folded and stored within a case, an inflator, a case with a mounting part to secure the open end of the air bag, an intervening cloth attached outside of the air bag and near the mounting part of the air bag case.

Air bag devices are required to fully deploy their air bags within a set time period after detecting an impact to the vehicle. Air bags come into contact with elements inside the vehicle and generate various types of friction. Because this invention installs an intervening cloth between the air bag and the interior elements, it secures a constant coefficient of friction. Thus, the air bag can deploy and contract smoothly.

PREFERRED EMBODIMENTS OF THE INVENTION

Figure 1:
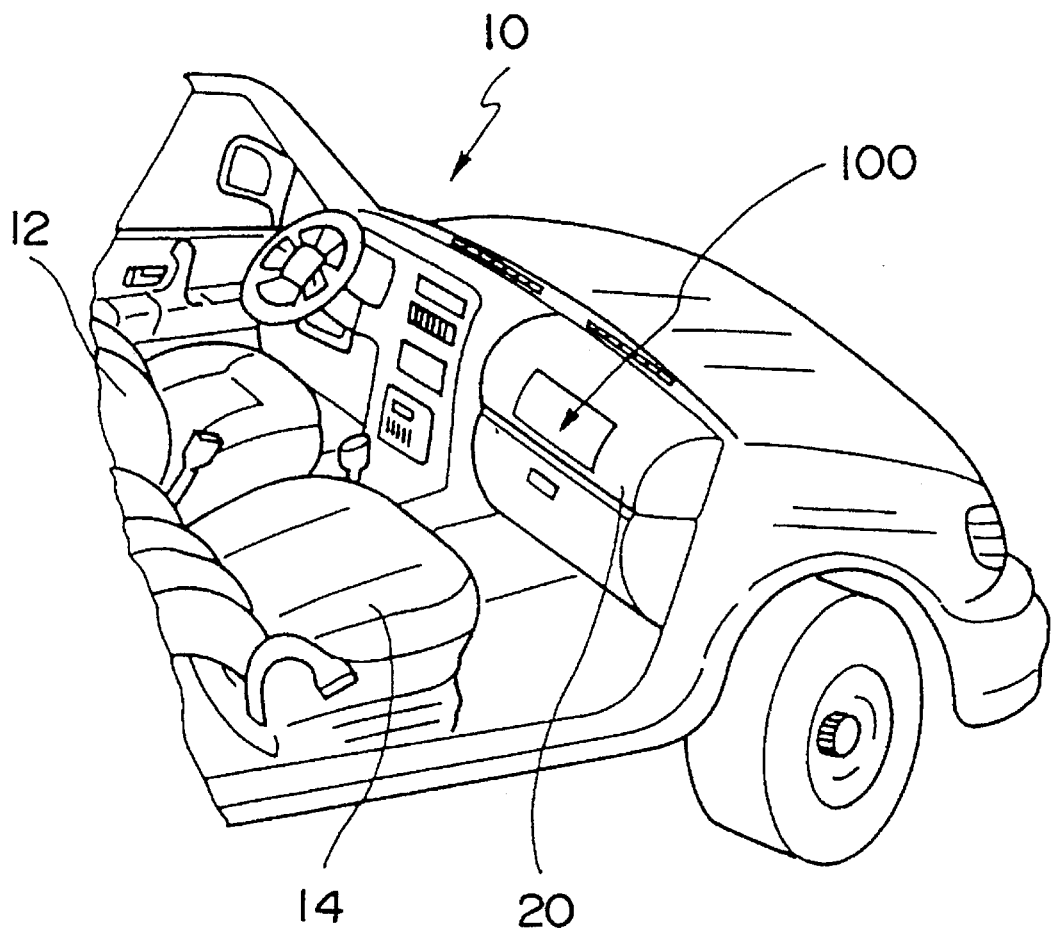
FIG. 1 is an explanatory drawing of the critical part of a vehicle equipped with the invention.
Figure 2:
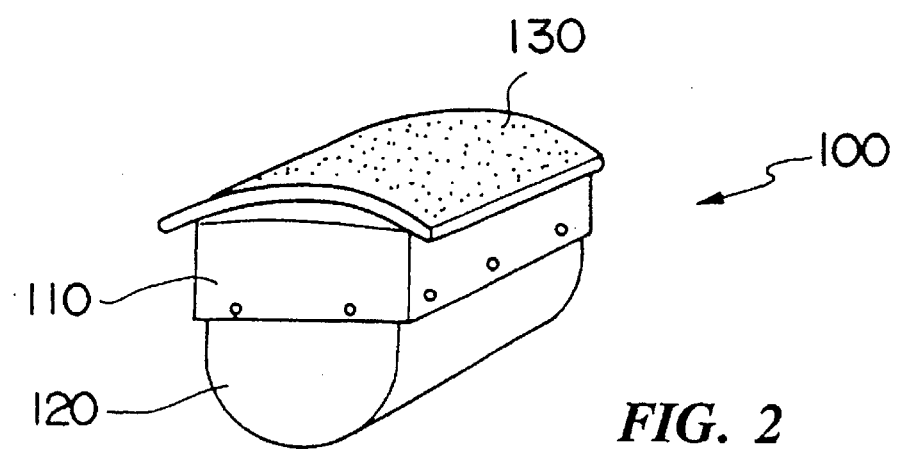
FIG. 2 shows an appearance of the air bag module.

FIG. 1 is a summary diagram of a vehicle equipped with this invention and FIG. 2 is a full view of the air bag module. Inside the vehicle (10), the dashboard (20) is located in front of the driver seat (12) and passenger seat (14). An air bag module (100) is installed inside the dashboard (20) in front of the passenger seat (14).

The air bag module (100) in FIG. 2 is equipped with a first case (110) and a second case (120) that store an air bag and an inflator, and the first case (110) is equipped with a door (130) at the opening.

Figure 3A:
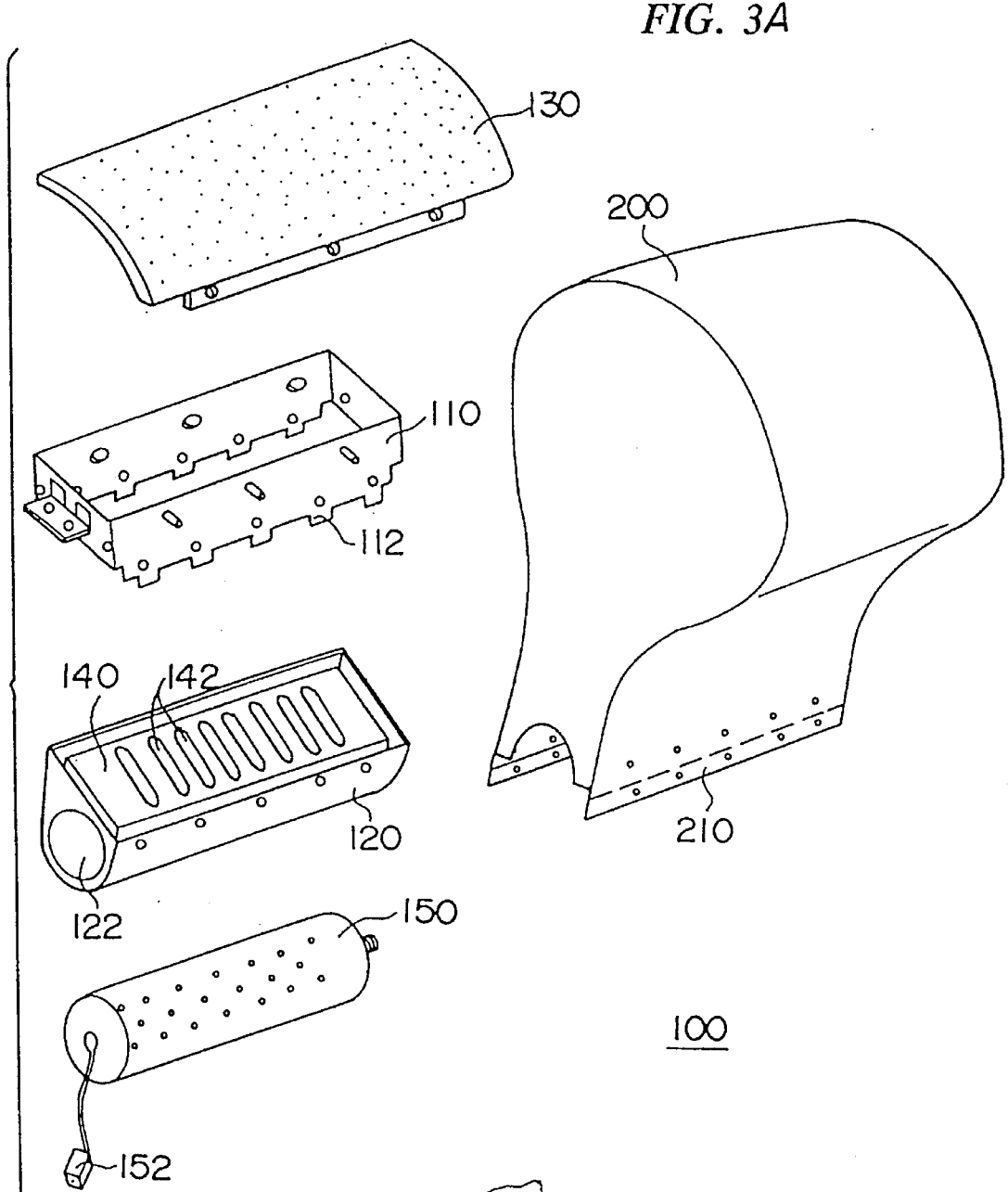
FIG. 3A is a component drawing.
Figure 3B:
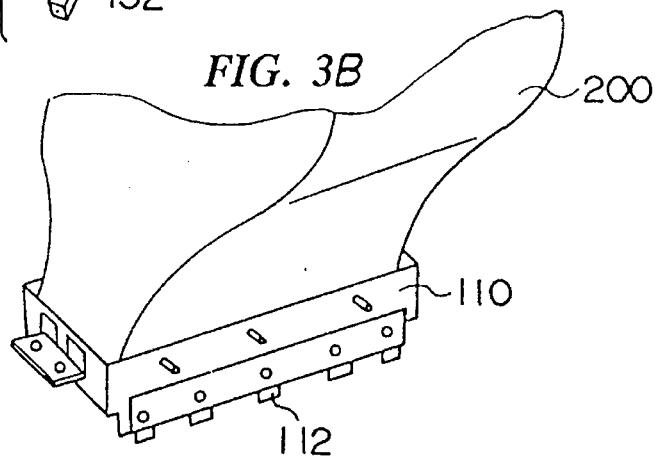
FIG. 3B is a drawing of an air bag.
Figure 4:
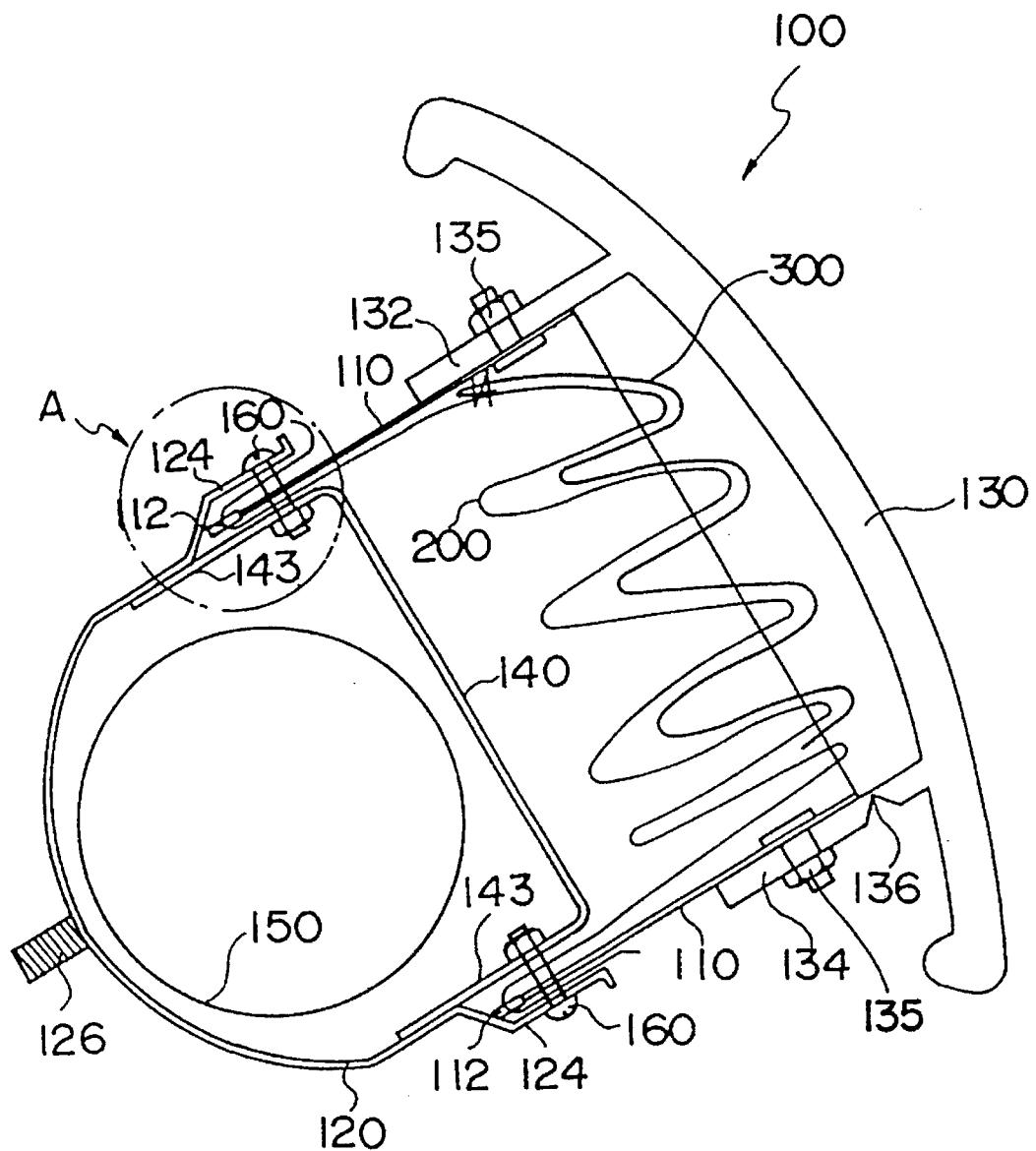
FIG. 4 is a cross section view of the air bag module in an example of the invention.

FIGS. 3A and 3B show components of the air bag module and FIG. 4 is a cross section of the air bag module. The air bag module (100) has a first case (110), which stores the folded air bag (200), and a second case (120), which is connected to the first case (110) and contains an inflator (150). The opening of the first case (110) is covered with a door (130).

The door (130) is made of resin or similar materials, and the front surface of the door is covered with the same material as the dashboard (20). It is secured to the first case (110) via flanges (132, 134) that are attached at the back with fasteners such as bolts (135). One flange (134) has a groove (136) that allows the door (130) to open when the air bag (200) is inflated.

The first case (110) is a square frame equipped with tabs (112) on the open end opposite from the door mounting part. The second case (120) has a cylinder (122), in which the inflator (150) is stored, and the open end (124) of the second case is formed so that it is broader in width than the opposite closed end A partition (140) inserted in the opening of the second case (120) has multiple slits (142). This partition (140) secures the inflator (150), and the gas from the inflator travels through the slits (142) to fill the air bag (200).

The lower end of the first case (110) is inserted in the space between the leg parts (143) of the partition (140) that is inserted into the second case (120) and the widened part (124) of the second case (120), and is tightened by a fastener (160) to comprise a linking part. The mounting part (210) of the air bag (200) is bent and secured at the linking point of the first case (110) and the second case (120). The inflator (150) has electrical wiring (152) and generates gas. The air bag module of this invention has the above basic structure as well as an intervening cloth (300) installed over the outer surface of the air bag (200) in order to maintain constant friction between the vehicle's interior elements and the air bag (200) during deployment.

Figure 5:
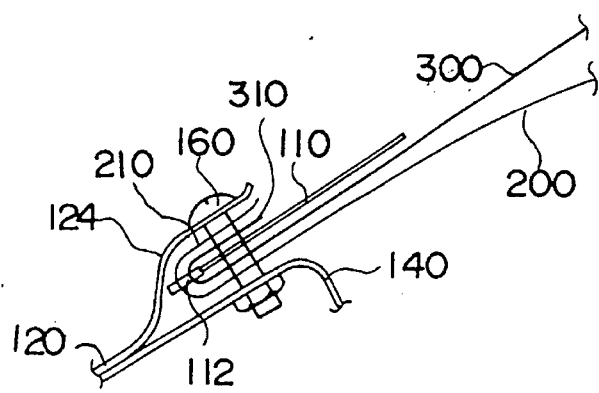
FIG. 5 is an enlarged view of the section A of FIG. 4.
Figure 6:
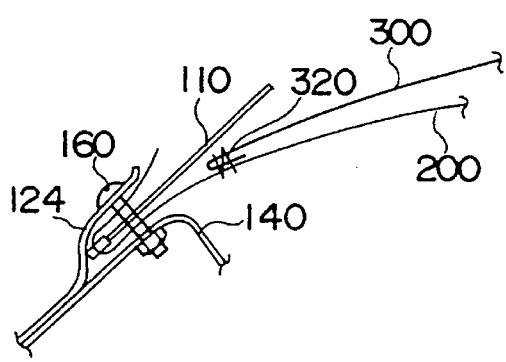
FIG. 6 is an enlarged view as in FIG. 5 in another example of the invention.
Figure 7:
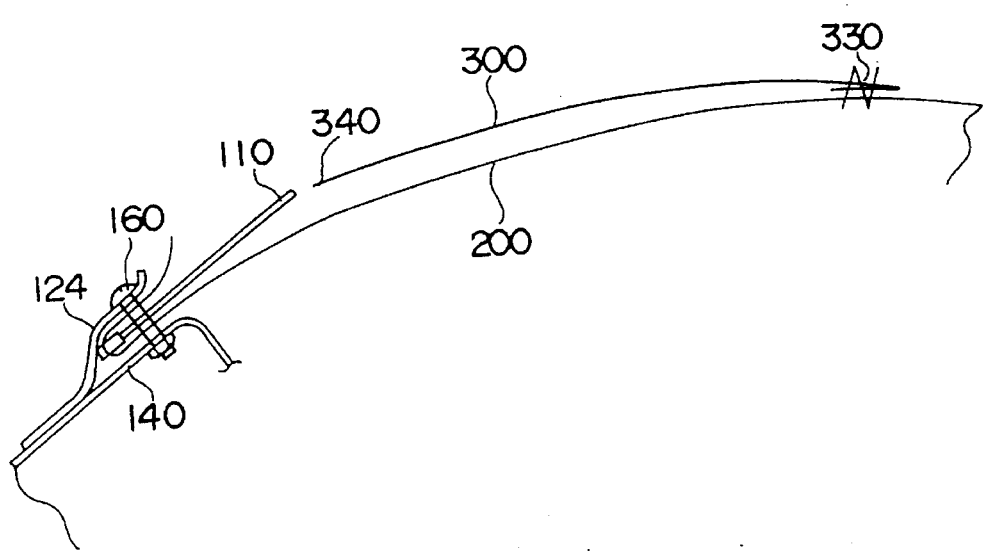
FIG. 7 is an enlarged view as in FIG. 5 in another example of the invention.

FIGS. 5 through 7 show various mounting structures for the intervening cloth (300).

In the example shown in FIG. 5, the intervening cloth (300) is installed outside of the air bag with its end (310) integrated with the end (210) of the air bag (200) and secured at the linking point of the first case (110) and the second case (120). The tabs (112) of the first case (110) are utilized for securing the pieces.

In the application example shown in FIG. 6, the intervening cloth (300) is sewed at stitching positions (320) onto the air bag (200). The stitching positions (320) are positioned near where the air bag is mounted to the case.

In the application example shown in FIG. 7, the intervening cloth (300) is sewed at stitching positions (330) in a similar fashion onto the air bag (200). The stitching positions, however, are positioned away from where the air bag (200) is mounted to the case. The free end (340) of the cloth (300) extends to the area near the opening end of the first case (110) when the air bag (200) is deployed.

The following describes how this invention functions.

Figure 8:
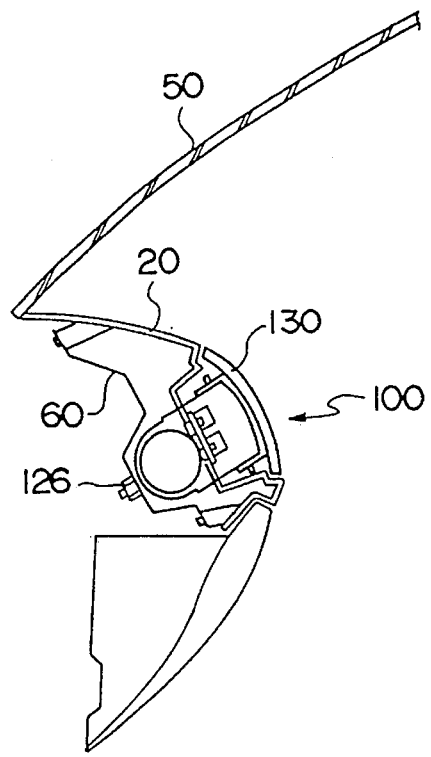
FIG. 8 is a cross section view of the mounting structure of the air bag module in the invention.

FIG. 8 shows the condition of the air bag unit (100) that is installed in the dashboard (20) in front of the passenger seat of a vehicle. The air bag unit (100) is secured against a high-strength element (60) of the vehicle on the back of the dashboard (20) with a fastener (126).

Figure 9:
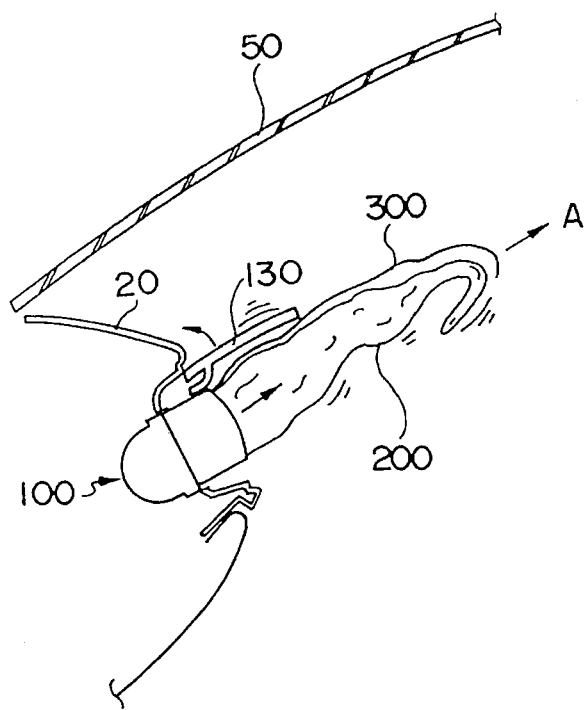
FIG. 9 is an explanatory diagram of the functions of the air bag in the invention.

FIG. 9 shows the condition in which the inflator has been ignited and the air bag (200) begins to deploy after the door (130) opens. The air bag (200) deploys in the direction of arrow A by the force of gas filling the bag. At this point, the air bag (200) comes to the inner surface of the door (130), thus causing friction. This friction works to regulate the deployment of the air bag (200). In this invention, the air bag (200) comes into contact with an intervening cloth (300), which is installed outside of the air bag (200), during deployment. The air bag (200) deploys smoothly because of the materials of the air bag (200) and the cloth (300), and their coefficients of friction.

Figure 10:
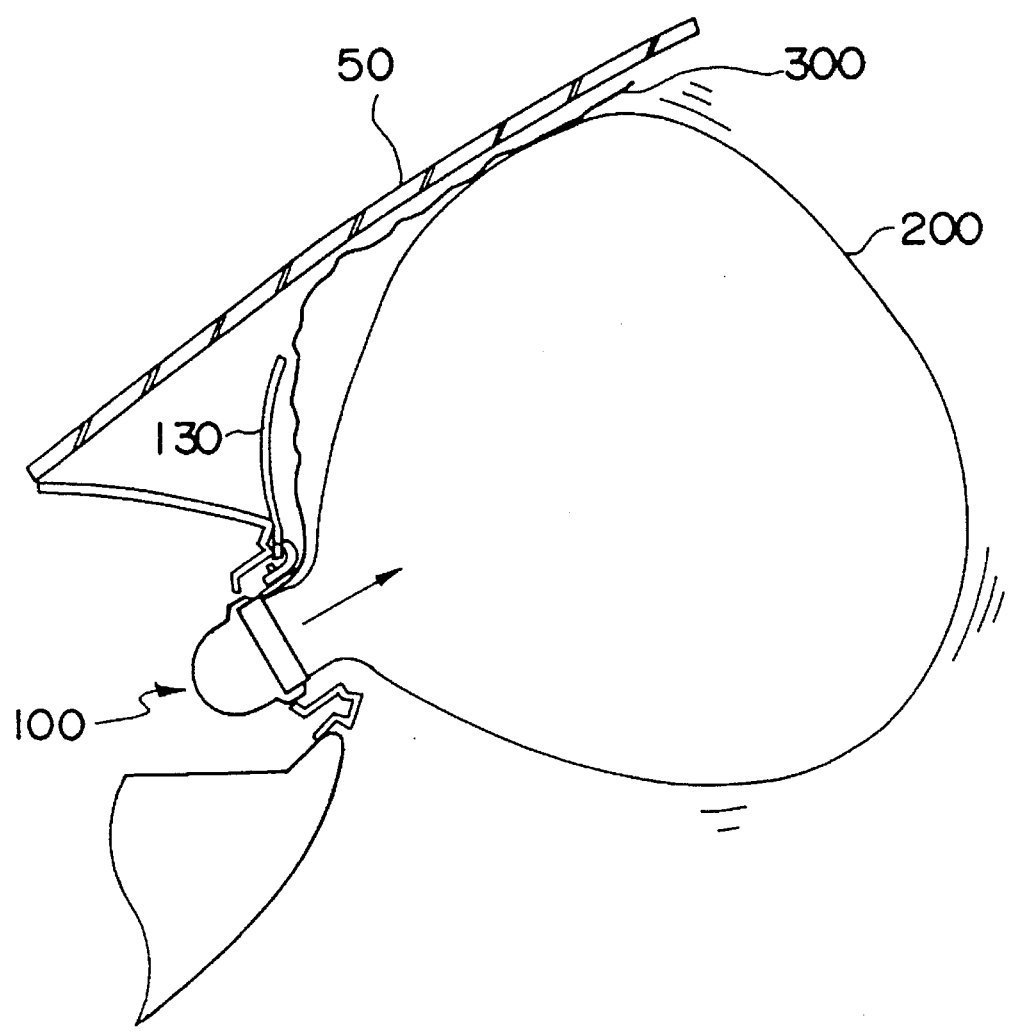
FIG. 10 is an explanatory diagram of the functions of the air bag in the invention.

FIG. 10 shows the condition of the air bag (200) when almost fully deployed. The air bag continues to deploy, coming to the front glass (50) of the vehicle. The intervening cloth remains between the air bag (200) and the front glass (50). Thus, the air bag (200) proceeds to deploy smoothly, while receiving constant friction.

Figure 11:
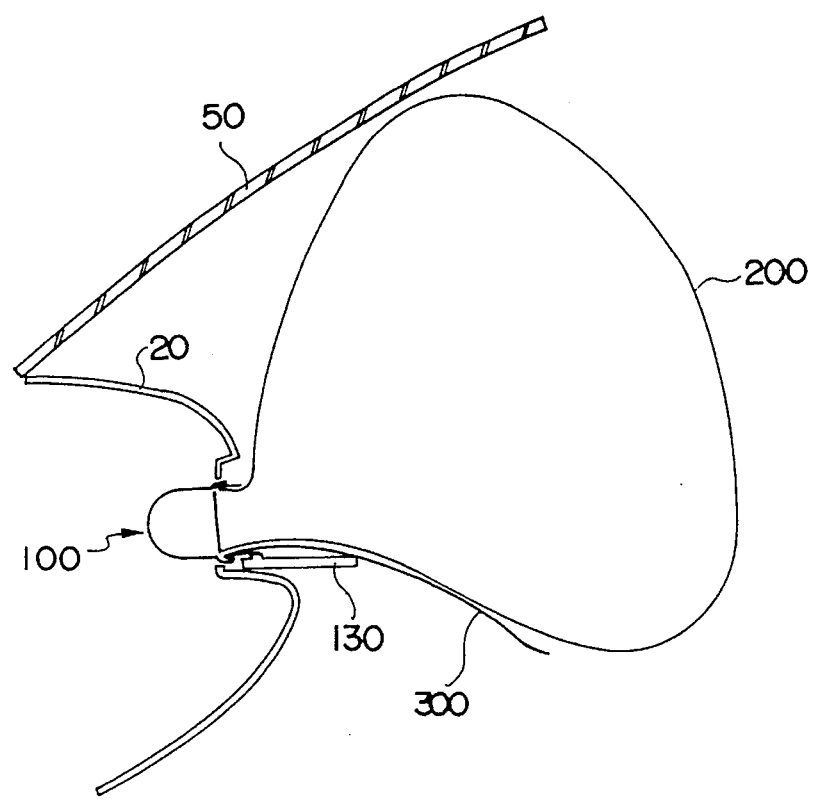
FIG. 11 is an explanatory diagram of the functions of the air bag in another application example of the invention.

FIG. 11 shows another example of the invention. In this example, the hinges of the door (130) for the air bag unit (100) are arranged at the lower side of the unit. The intervening cloth (300) is also installed at the lower side of the air bag (200), between the air bag (200) the door (130), in order to facilitate smooth deployment of the air bag.

Figure 12:
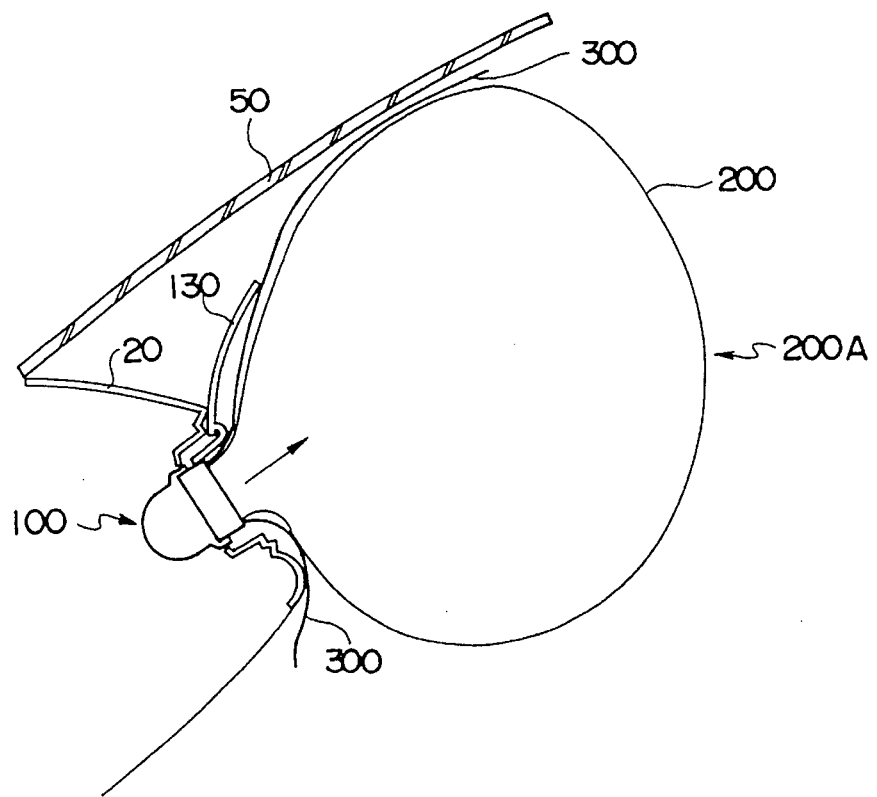
FIG. 12 is an explanatory diagram of the functions of the air bag in another example of the invention.

FIG. 12 shows another example in which the intervening cloth (300) is arranged at both the upper and lower sides of the air bag (200). The intervening cloth (300) is arranged in order to maintain a constant coefficient of friction between the air bag (200) and the surrounding interior elements, and thus does not cover the area of contact with the passenger (200A).

Figure 13A:
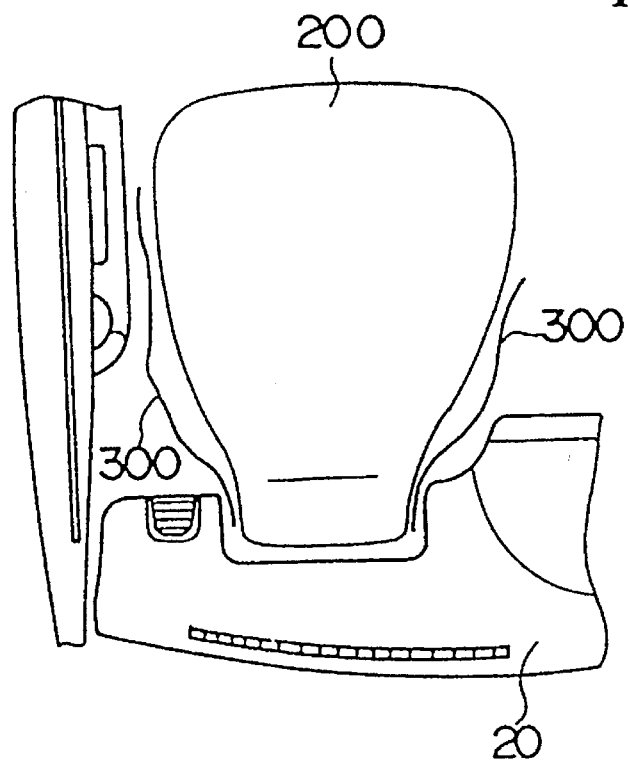
FIGS. 13A and 13B are explanatory diagrams of the functions of the air bag in another example of the invention.
Figure 13B:
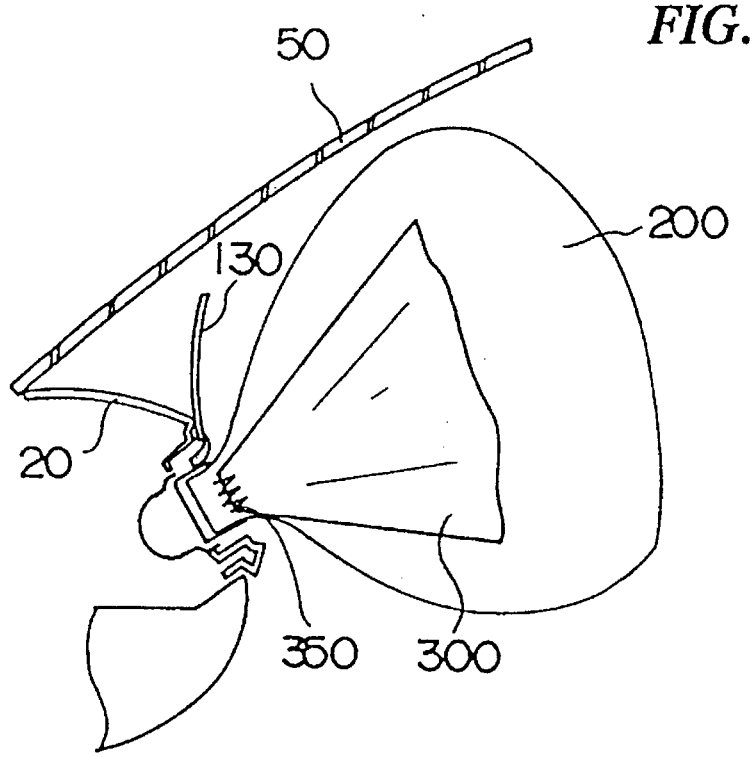

FIGS. 13A and 13B show another example, with the intervening cloth (300) installed on both the left and right sides of the air bag (200). The intervening cloth (300) is sewed at the stitching positions (350) to the air bag (200).

As described above, the air bag module of this invention is equipped with an intervening cloth located outside of the air bag which is being deployed by gas. Air bags usually generate friction when they come into contact with surrounding elements inside the car as they are being deployed. This device is structured so that the intervening cloth is sandwiched between the air bag and surfaces which the air bag would come into contact. Therefore, the air bag touches only the intervening cloth, instead of interior elements which have various coefficients of friction. The coefficient of friction between the air bag and the intervening cloth is constant, thus the air bag can be deployed smoothly into a set form and within a set time period. In addition, the inflated air bag can contract smoothly. Furthermore, this invention effectively protects the air bag because it eliminates any instances of the air bag being caught and damaged by interior elements.

What is claimed is:

1. An air bag device for installation in a dash board of a vehicle, said air bag device comprising:

a case having an open side and adapted to be inserted into an opening of a dash board of a vehicle;

an air bag having an open end, said air bag being folded within said case with the open end secured to said case adjacent the open side thereof, said air bag being inflatable to deploy out from said case through the case open side and the dash board opening and into the interior of the vehicle;

a door of predetermined width and height, said door closing said case open side with said air bag folded therein and being adapted to be opened upon inflation of said air bag to permit said air bag to deploy into the interior of the vehicle;

a substantially planar intervening cloth secured between said air bag and said door and adapted to intervene between said air bag and said door as said air bag is inflated, said intervening cloth having a length permitting said intervening cloth to extend beyond said door and into the interior of the vehicle and to intervene between said air bag and interior components of the vehicle as said air bag deploys.

2. An air bag device according to claim 1, wherein said intervening cloth is secured to said case.

3. An air bag device according to claim 1, wherein said intervening cloth is secured to said air bag.

4. An air bag device according to claim 1, wherein said intervening cloth is secured to deploy over the top of said air bag as said air bag deploys, and said intervening cloth has a length permitting said intervening cloth to intervene between said air bag and a windshield of the vehicle.

5. An air bag device according to claim 1, wherein said intervening cloth in secured to deploy along a first side of said air bag as said air bag is deployed, and wherein said device further comprises a second intervening cloth secured to deploy along a second side of said air bag, opposite said first side of said air bag, and into the interior of the vehicle as said air bag is deployed.

\* \* \* \* \*